(12) United States Patent
    Fowler

(10) Patent No.: US 10,594,742 B1
(45) Date of Patent: Mar. 17, 2020

(54) "CONNECTION KEY" MECHANISM FOR USING SERVICE RELATED OBJECTS AND CLASSES ACROSS THREADS WHILE NEVER PASSING THE SERVICE CONNECTION ITSELF ACROSS THREADS

(71) Applicant: EMC Corporation, Hopkinton, MA (US)

(72) Inventor: Daniel Fowler, Broomfield, CO (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1002 days.

(21) Appl. No.: 14/641,799

(22) Filed: Mar. 9, 2015

(51) Int. Cl.
    *H04L 29/06* (2006.01)
    *H04L 29/08* (2006.01)
(52) U.S. Cl.
    CPC .......... *H04L 65/1069* (2013.01); *H04L 67/10* (2013.01)
(58) Field of Classification Search
    CPC ..... H04L 63/0815; H04L 63/08; H04L 63/10; H04L 63/0823; H04L 67/141; H04L 67/10; H04L 63/0807
    USPC ........................................................ 709/228
    See application file for complete search history.

(56) References Cited

U.S. PATENT DOCUMENTS

| | | | | |
|---|---|---|---|---|
| 2006/0143217 A1* | 6/2006 | Stanev | .................... | G06Q 10/06 |
| 2006/0248283 A1* | 11/2006 | Galchev | ................ | G06F 9/5033 |
| | | | | 711/141 |
| 2007/0156907 A1* | 7/2007 | Galchev | ................ | G06F 9/5027 |
| | | | | 709/227 |
| 2010/0058455 A1* | 3/2010 | Irudayaraj | ............... | H04L 63/02 |
| | | | | 726/11 |
| 2015/0134834 A1* | 5/2015 | Galchev | ................ | G06F 9/5027 |
| | | | | 709/227 |

\* cited by examiner

*Primary Examiner* — William G Trost, IV
*Assistant Examiner* — Imran Moorad
(74) *Attorney, Agent, or Firm* — Womble Bond Dickinson (US) LLP

(57) ABSTRACT

Exemplary methods for performing web service calls include receiving, from a first client application associated with a first thread, a first request to establish a first connection with a first service endpoint providing a first service, the first request including a first connection key. The methods further include in response to the first request, identifying a first stub manager object that corresponds to the first connection key and the first thread, the first stub manager object representing a first instance of a stub manager. The methods further include providing, exclusively to the first client application of the first thread, the first stub manager object, wherein the first client application of the first thread is to use the first stub manager object for communicating with the first service endpoint.

24 Claims, 7 Drawing Sheets

"CONNECTION KEY" MECHANISM FOR USING SERVICE RELATED OBJECTS AND CLASSES ACROSS THREADS WHILE NEVER PASSING THE SERVICE CONNECTION ITSELF ACROSS THREADS

FIELD OF THE INVENTION

Embodiments of the present invention relate generally to computer systems. More particularly, embodiments of the invention relate to thread safe usage of service stubs for providing web services.

BACKGROUND

A web service is a method of communication between computer systems via the web. For example, applications running on different computer systems may communicate with each other via the web using a web service. Web services may be implemented using Simple Object Access Protocol (SOAP), which is a protocol that provides mechanisms for exchanging structured information between computer systems. SOAP uses the Extensible Markup Language (XML) Information Set for its message format, and relies on application layer protocols (e.g., Hypertext Transfer Protocol (HTTP), Simple Mail Transfer Protocol (SMTP), etc.) for message negotiation and transmission.

In order for a web service client (executing at one computer system) to communicate with a web service provider (executing at another computer system) via the web, the web service client (herein referred to simply as the "service client") instantiates a web service stub (herein referred to simply as a "service stub"). As used herein, a "service stub" refers to an object which is responsible for connecting and communicating with a web service skeleton (herein referred to simply as a "service skeleton") which is an object has been instantiated at the web service provider (herein referred to simply as the "service provider").

By way of example, when a client application (e.g., a backup client application) executing at a service client needs to request a server application (e.g., a backup server application) executing at a service provider to perform a service (e.g., backup data from a source storage system to a target storage system), the service client must first perform a web service call to the service provider. As used herein, "performing a web service call" refers to a service stub of a service client exchanging messages with a service skeleton of a service provider in order to establish a connection between themselves. Once the connection is established, the client application may send service requests (e.g., backup requests) to the server application via the established connection. For example, the client application sends a service request to the service stub, which in turn, transmits it to the service skeleton. The service skeleton, in response to receiving the service request, sends it to the server application. The server application performs the requested service (e.g., the requested backup), and may provide some information (e.g., statuses, etc.) to the service skeleton, which in turn transmits it to the service stub at the service client. The service stub then sends the information to the client application which called (i.e., invoked) the service.

Multiple client applications may each perform a web service call (i.e., connect) to the same service provider, each using its own software thread. Conventionally, when multiple client applications connect to the same service provider, the service client instantiates a single service stub, and this single service stub is shared by all the threads. Such a non-thread safe usage of the service stub is problematic because the data exchanged between the service client and the service provider may be corrupted. For example, the input and/or output buffers associated with the service stub may contain data from multiple threads, rendering the data unusable by any thread.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
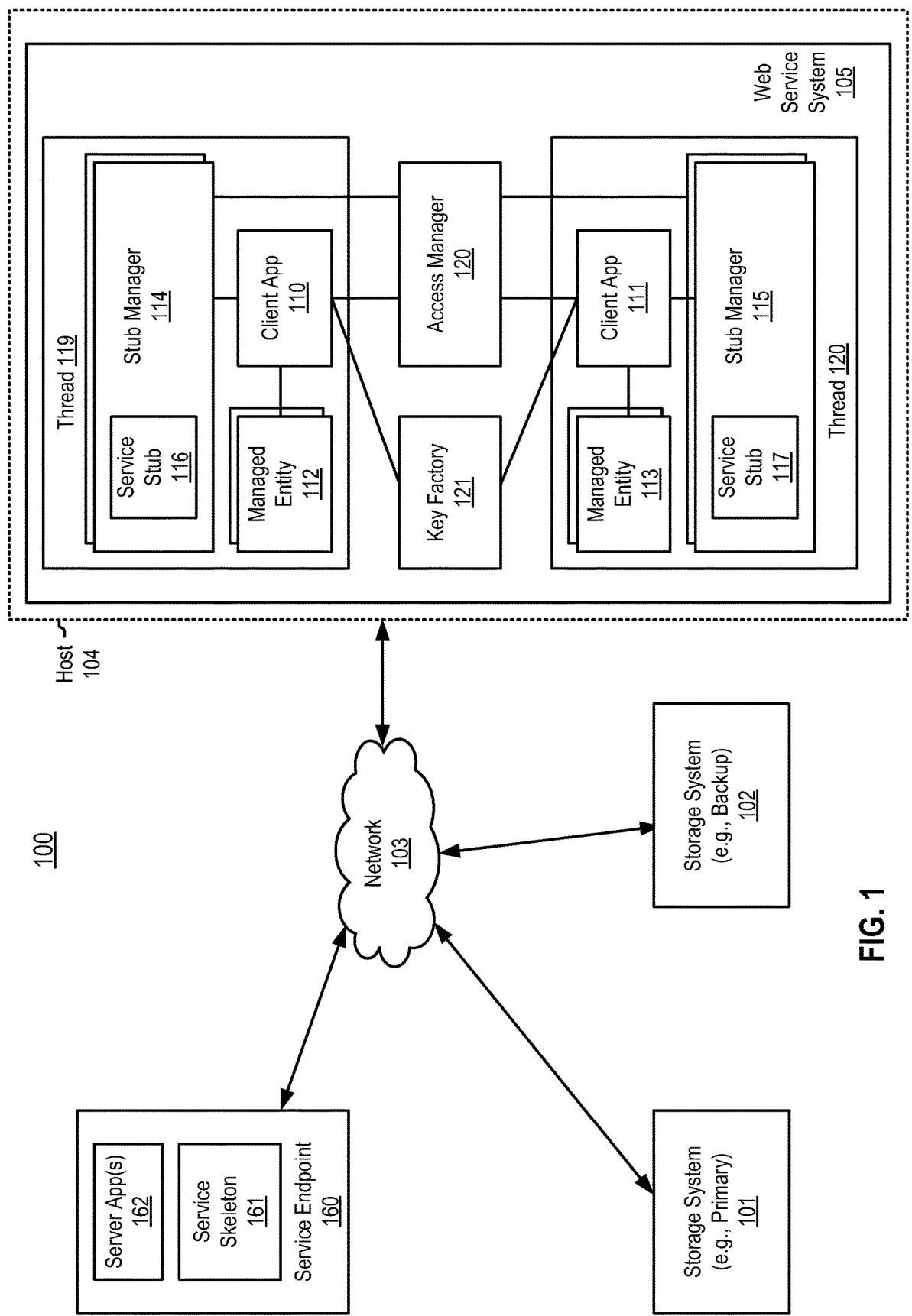
FIG. 1 is a block diagram illustrating a system for providing web services according to one embodiment of the invention.

FIG. 1 is a block diagram illustrating a system for providing web services according to one embodiment of the invention. Referring to FIG. 1, system 100 includes, but is not limited to, host system 104 communicatively coupled to service endpoint 160 via network 103. Network 103 may be any type of network such as a local area network (LAN), a wide area network (WAN) such as the Internet, a fiber network, a storage network, or a combination thereof, wired or wireless.

Host system 104 and service endpoint 160 can be any type of client such as a host or server, a personal computer (e.g., desktops, laptops, and tablets), a "thin" client, a personal digital assistant (PDA), a web enabled appliance, or a mobile phone (e.g., Smartphone), etc. As used herein, a "service endpoint" refers to any network device which is capable of providing services, such as web services, to other network devices. Service endpoint 160, in one embodiment, is a web service provider/server that includes components for providing web services to other network devices, such as host 104. For the illustration purposes, a Web service is utilized as an example of services that can be provided over a network. However, it is not so limited; other types of services can also be applied. For example, instead of a Web service provided by a Web server, a service can also be provided by an application server or a backend system via a set of application programming interfaces (APIs) and/or communications protocols. A service may also be a service provided by a first application (e.g., an application running within a first virtual machine or VM) and requested from a second application (e.g., an application running within a second VM) running within the same computer or operating system. In one such embodiment, service endpoint 160 includes, but is not limited to, service skeleton 161 for communicating with service stubs instantiated at service clients. Service endpoint 160 may further include server application(s) 162 (e.g., a backup server application, email archive application, etc.) for providing services that may be "called" (i.e., invoked) by the service clients.

Host 104 and/or service endpoint 160 may further be communicatively coupled to other network devices, such as, for example, storage systems 101-102 via network 103 (e.g., storage appliances over a storage network or bus). Each of storage systems 101-102 may be a primary storage system or a backup storage system. In the illustrated example, storage systems 101-102 are primary storage system (e.g., local data center) and backup storage system (e.g., a disaster recovery site or system), respectively. By way of example, primary storage system 101 provides storage to local clients, and may periodically back up the content stored therein to backup storage system 102. Storage systems 101-102 may be in physical proximity or may be physically remote from one another. Host system 104 and/or service endpoint 160 may be located in proximity to one, both, or neither of storage systems 101-102.

According to one embodiment, host 104 provides mechanisms for one or more client applications executing therein to perform web service calls to one or more service endpoints. By way of example, host 104 may include a backup client application (e.g., client application 110) that needs to request a backup server application (e.g., server application 162) executing at a service endpoint (e.g., service endpoint 160) to perform a backup from a primary storage system (e.g., storage system 101) to a backup storage system (e.g., storage system 102). In such an example, the backup client application may cause a service stub (e.g., service stub 116) at host 104 to perform a web service call to a service skeleton (e.g., service skeleton 161) at the service endpoint.

A service stub may be a data object or data structure operating as a place holder of entry points of functionalities that have been configured to invoke a service (e.g., a remote Web service) provided by a specific service provider over a network. A service stub may include certain function members and data members, publicly or privately, to be used by a client to call or invoke the corresponding service provided by a corresponding service provider over a network. Similarly, a service skeleton represents the server counterpart having certain function members or data members, similar to a service stub at a client side, to communicate or negotiate with the service stub at the client side, and to provide services requested by the service stub at the client side. The communications between a service skeleton at the server side and a service stub at a client side can be conducted using a variety of communications protocols and/or formats, as long as they agree upon each other. Once the connection is established between the service stub and the service skeleton, the backup client application sends the backup request to the service stub, for example, by calling a corresponding function member of a service stub object corresponding to the service stub, which in turn transmits it to the service skeleton at the service endpoint via the established connection. For the purposes of illustration, the terms of "service stub" and "service stub object" are interchangeable terms throughout this application. From an object-oriented programming environment, when a service stub is utilized, a corresponding service stub object is invoked. Similar architecture may also be applied to other components described throughout this application, such as, for example, a stub manager vs. a stub manager object, etc. That is, each component is represented by an object or data structure containing certain function members and data members to carry out the functionalities of the component. Continuing on with the example, the service skeleton then sends the service request to the backup server application. The backup server application performs the requested backup service, and may return information concerning the requested service to the backup client application via the established connection, wherein the returned information is stored in a container object such as managed entity 112.

Throughout the description, the mechanisms for performing web service calls of the present invention are described in the context of storage backup. It should be noted that the present invention is not so limited, and applies equally to any service that may be provided by any service endpoint.

According to one embodiment, host 104 includes, but is not limited to, web service system 105 for performing web service calls to service endpoints. Web service system 105 includes, but is not limited to, client applications 110-111. For example, client applications 110-111 may be backup client applications, email archive client applications, etc. In some instances, client applications 110-111 may need to perform web service calls to service endpoints. For example, client applications 110-111 may both need to perform a web service call to service endpoint 160 as part of threads 119-120, respectively. A conventional service client would instantiate a single service stub to be shared by both client applications for communicating with service endpoint 160. Such a non-thread safe usage of the single service stub results in corrupted data as described above.

Embodiments of the present invention overcome such limitations by including key factory or key generator 121 and access manager 120 as part of web service system 105. Continuing on with the above example, client applications 110-111 both request key factory 121 for a connection key (herein referred to simply as a "key") that describes service endpoint 160.

Each of client applications 110-111 then requests access manager 120 to provide a reference to (i.e., instantiate) a service stub manager based on the key and further based on the thread to which the client application is associated with. In the illustrated example, access manager 120 instantiates stub managers 114-115 for client applications 110-111, respectively, associated with threads 119-120, respectively.

According to one embodiment, each stub manager includes a service stub for connecting to a corresponding service skeleton. In this example, stub managers 114-115 include service stubs 116-117, respectively, for connecting to service skeleton 161 of service endpoint 160. It should be noted that by instantiating stub managers based on threads, access manager 120 is able to provide each thread with its own stub manager and overcome the data corruption limitations of conventional service clients, even though both threads are performing web service calls to the same service endpoint. In one embodiment, a stub manager operates as a container or wrapper containing a service stub therein, for example, for security purposes. In one embodiment, each stub manager includes logic for causing its service stub to connect, disconnect, and verify the current state of the connection (e.g., live or dead).

In one embodiment, managed entities 112-113 are generated to store data objects received from remote service endpoint(s), wherein each managed entity corresponds to a connection. For example, in response to receiving data objects from service endpoint 160, client applications 110-111 pass the received data and the associated key to a managed entity class constructor (not shown), which in turn, generates managed entities 112-113, respectively. For example, managed entity 112 corresponds to the connection between service stub 116 and service endpoint 160, while managed entity 113 corresponds to the connection between service stub 117 and service endpoint 160. Each of managed entities 112-113 is to receive and store data objects (i.e., information) returned by a service endpoint associated with its connection. Such information are associated with the services that client applications 110-111 requested the server applications at the service endpoint(s) to perform.

In some embodiments, client applications 110-111 may need further information associated with the data objects stored by managed entities 112-113. In one such embodiment, managed entities 112-113 are adapted to communicate with the server application at the remote service endpoint that provided the stored data objects. In order to avoid each managed entity having to re-request for a key, in one embodiment, each managed entity is to maintain a reference to its key (i.e., the key that identifies the service endpoint associated with its connection). In this way, each of managed entities 112-113 can use its key to request access manager 120 to provide a reference to a corresponding service stub manager. Managed entities 112-113 then use the provided stub managers to communicate with the corresponding service endpoints and retrieve the further information required by client applications 110-111. It should be noted that because each managed entity maintains a reference to its key (as opposed to a stub manager), the managed entities can be passed between and used by multiple threads in a thread safe manner.

Note that some or all of the components as shown and described above (e.g., the components of web service system 105) may be implemented in software, firmware, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

According to one embodiment, the various modules or components of web service system 105 can be implemented as part of one network device (e.g., host system 104). In an alternative embodiment, the various modules of web service system 105 can be implemented as virtual machines that are executed on multiple network devices. In such an embodiment, the various virtualized modules of web service system 105 that are distributed among different network devices communicate with other using tunneling mechanisms (e.g., Virtual Extensible LAN (VxLAN)). As used herein, a "virtual machine" refers to a software-based emulation of a particular computer system. A virtual machine performs tasks that are similar to their traditional hardware counterpart. Embodiments of the present invention shall now be described in greater details through the discussion of various other figures below.

Figure 2:
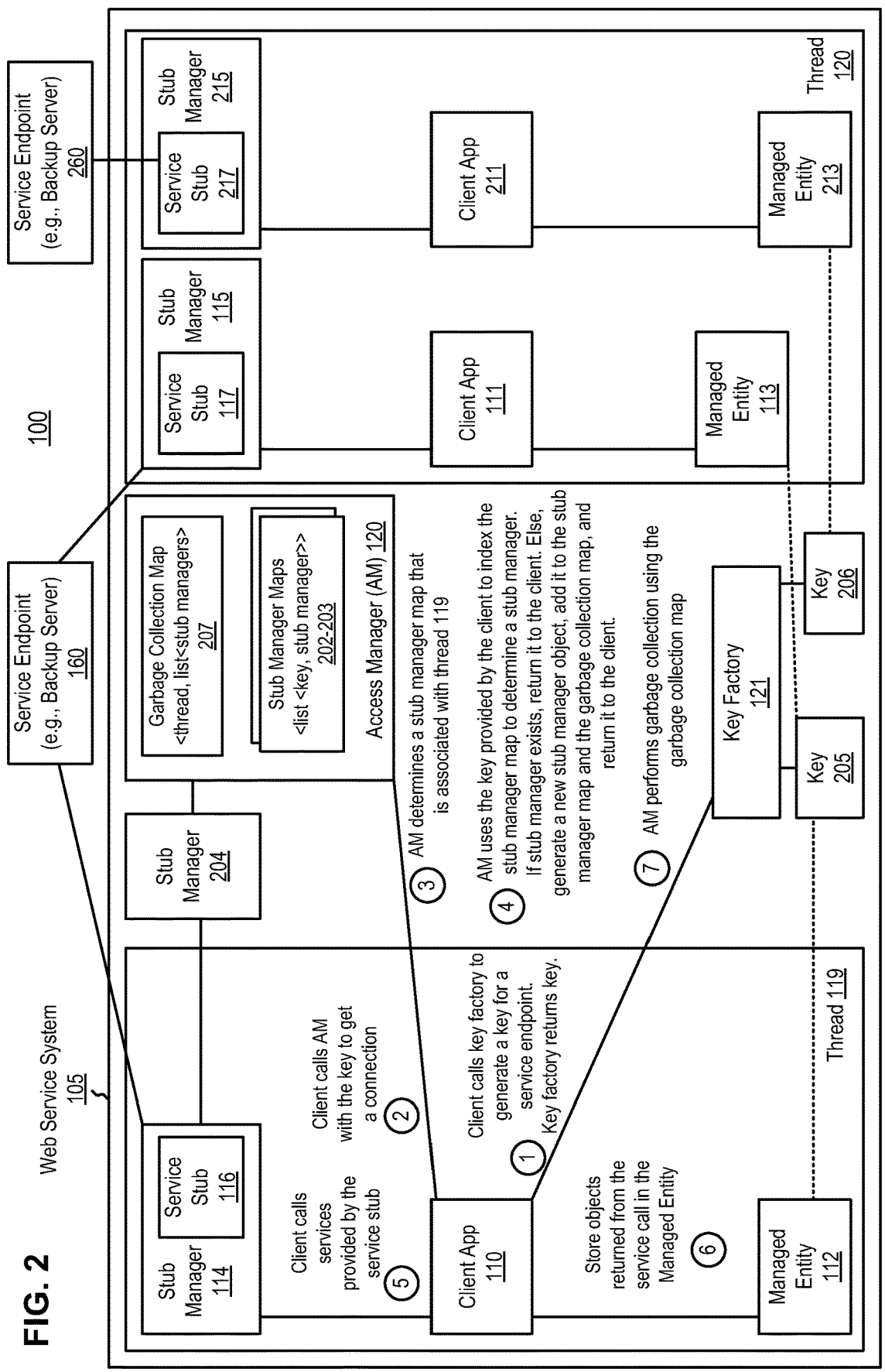
FIG. 2 is a block diagram illustrating a system for providing web services according to one embodiment of the invention.

FIG. 2 is a block diagram illustrating a system for providing web services according to one embodiment of the invention. System 100 illustrated in FIG. 1 is similar to system 100 illustrated in FIG. 2. Certain details have been omitted, however, in FIG. 2 in order to avoid obscuring the invention. Further, certain other details have been added in FIG. 2 in order to better illustrate the invention. FIG. 2 illustrates operations that are performed by web service system 105 for performing web service calls according to one embodiment. Each operation is illustrated in FIG. 2 as a number inside a circle.

Referring now to FIG. 2, at operation 1, in response to determining to perform a web service call to service endpoint 160, client application 110 requests key factory 121 to generate or provide a key that identifies service endpoint 160. The request may include all the necessary information or parameters to describe the service and its corresponding service provider to be invoked. Key factory 121 may be implemented in software, firmware, hardware, or any combination thereof. For example, key factory 121 may be implemented as a class. In object-oriented programming, a "class" is an extensible program code template for creating objects, providing initial values for state (member variables) and implementations of behavior (member functions, methods).

In an embodiment where key factory 121 is implemented as a class, key factory 121 may include a method (e.g., getDefaultConnectionKey( )) that returns a default key identifying a default service endpoint. Alternatively, or in addition to, key factory 121 may include a method (e.g., buildNewConnectionKey( )) that takes connection details (describing the service endpoint) as input parameters, and returns a specific key that identifies a specific service endpoint identified by the input connection details. Connection details may include, for example, a service endpoint uniform resource identifier (URI), a username identifying the user of the client application, a password (which may be encrypted), locale, product name, a Boolean value indicating whether to trust all secure sockets layer (SSL) certificates. These connection details are described for illustrative purposes, and not intended to be limitations of the present invention. Thus, for example, as part of operation 1, client application 110 may call on method getDefaultConnectionKey( ) or method buildNewConnectionKey( ) to obtain a key from key factory 121.

As part of operation 1, key factory 121 generates and returns the requested key to client application 110. In one embodiment, key factory 121 may maintain all the keys that have been generated and stored in a persistent storage device (e.g., hard drive). When a request is received for a particular service, key factory 121 may examine the request to determine whether a connection key corresponding to the requested service has been previously requested, for example, from another client, and stored in a key database (not shown). If so, an existing connection key is returned; otherwise, a new connection key is generated and its key database is updated accordingly. In the illustrated example, key factory 121 returns key 205 to client application 110. In an embodiment where key factory 121 is implemented as a class, each of the keys which it generates may be implemented as an immutable data object. Here, "immutable" refers to the notion that once a key is generated, its content cannot be altered. For example, some or all of the data members or attributes describing the key may be implemented as private data members that are inaccessible or invisible from a client. According to one embodiment, a key includes a method (e.g., equals( )) that takes another key as an input parameter, and returns a Boolean value indicating whether its connection details match the connection details of the input key. The use of such a method is described in further details below. That is, a client can only utilize a public function member to access (e.g., read only) the internal data of the key.

At operation 2, client application 110 requests access manager 120 to establish a connection with service endpoint 160, wherein the request includes key 205 which describes service endpoint 160. Access manager 120 may be implemented in software, firmware, hardware, or any combination thereof. For example, access manager 120 may be implemented as a class. In such an embodiment, access manager 120 may include a method (e.g., getConnection( )) that takes a key as an input parameter, and returns a stub manager object corresponding to a service connection being requested. Access manager 120 may further include a method (e.g., getLiveConnection( )) which performs similar functions as those performed by the getConnection( ) method, except that getLiveConnection( ) also ensures that the connection between the stub manager object and the service endpoint identified by the input key is live. In one embodiment, access manager 120 includes a method (e.g., cleanupOrphanedAndExpiredConnections( )) for performing garbage collection on the stub manager objects. The use of these methods shall become apparent through the description below.

Figure 3:
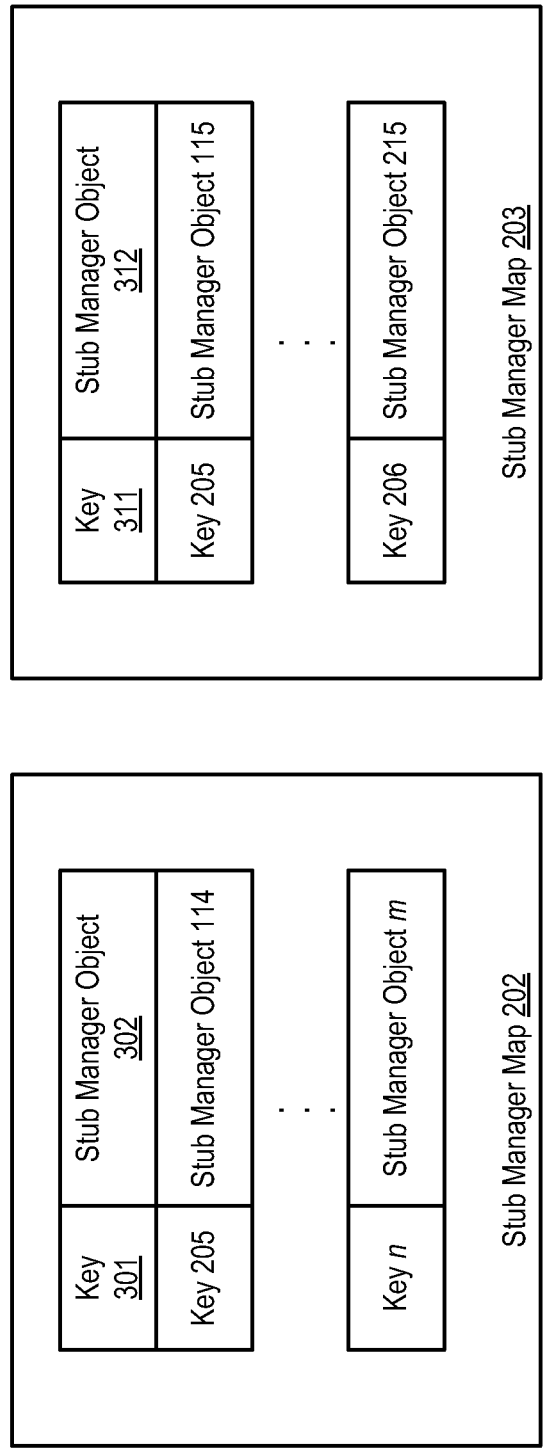
FIG. 3 is a block diagram illustrating stub manager maps according to one embodiment.

According to one embodiment, access manager 120 maintains a plurality of stub manager maps, tables, or similar data structures, each of which may be implemented as one or more data structures stored in one or more storage devices accessible by access manager 120. Each stub manager map is associated with a thread, for example, storing one or more connections with one or more remote service endpoints that have been initiated by the corresponding thread. In one embodiment, each stub manager map includes a list of one or more stub manager objects, and each stub manager object in the list is associated with a key. In the illustrated example, access manager 120 maintains stub manager maps 202-203, an embodiment of each is illustrated in FIG. 3. Throughout the description, it is assumed that stub manager maps 202-203 are associated with threads 119-120, respectively.

FIG. 3 is a block diagram illustrating stub manager maps according to one embodiment. Stub manager map 202 associated with thread 119 includes key column 301 for storing one or more keys, each of which is associated with a stub manager object stored in stub manager object column 302. In the illustrated example, stub manager map 202 includes key 205 associated with stub manager object 114, and key n associated with stub manager object m. Stub manager map 203 associated with thread 120 includes key column 311 for storing one or more keys, each of which is associated with a stub manager object stored in stub manager object column 312. In the illustrated example, stub manager map 203 includes key 205 associated with stub manager object 115, and key 206 associated with stub manager object 215.

Returning now back to FIG. 2. At operation 3, in response to client application 110 requesting for a connection (e.g., client application 110 calling on method getConnection( ) or method getLiveConnection( )) access manager 120 identifies a stub manager map that is associated with the thread that client application 110 is associated with (i.e., thread 119). In this example, access manager identifies stub manager map 202.

At operation 4, access manager 120 uses the key included as part of the key generation request (i.e., key 205) to determine whether it matches any of the keys included in stub manager map 202. For example, access manager 120 may call on method equals( ) of each key in stub manager map 202 until a match is found. In response to finding a match, if the getLiveConnection( )(as opposed to the getConnection( )) was called by client application 110, access manager 120 determines whether the connection between the stub manager object (that is associated with the matching key) and the corresponding service endpoint is live. If the connection is dead (e.g., has not been actively used for a predetermined period of time), access manager 120 is to reconnect/re-establish the connection. Access manager 120 then returns to client application 110 the stub manager object that is associated with the matching key. Assuming the example illustrated in FIG. 3, access manager 120 determines that key 205 included in the request matches the first key in key column 301 and returns to client application 110 a reference to stub manager object 114.

Alternatively, as part of operation 4, in response to determining key 205 included in the request does not match any of the keys included in stub manager map 202, access manager 120 is to cause stub manager 204 to generate or allocate a new stub manager object. Stub manager 204 can be implemented in software, firmware, hardware, or any combination thereof. For example, stub manager 204 may be implemented as a class. In such an embodiment, stub manager 204 may include a method (e.g., buildStubManager( )) that takes a key as an input parameter, and returns a stub manager object. For example, access manager 120 may call on buildStubManager( ) to generate a new stub manager object. In such an embodiment, each generated stub manager object is referred to as an instance (i.e., object) of stub manager 204. Access manager 120 then adds the new stub manager object (in this example, stub manager object 114) and its associated key (in this example, key 205) to stub manager map 202.

According to one embodiment, access manager 120 is to generate and maintain garbage collection map 207, which can be implemented as one or more data structures stored in one or more storage devices accessible by access manager 120. In one embodiment, garbage collection map 207 includes a plurality of lists of stub manager objects, each list corresponding to a thread.

Figure 4:
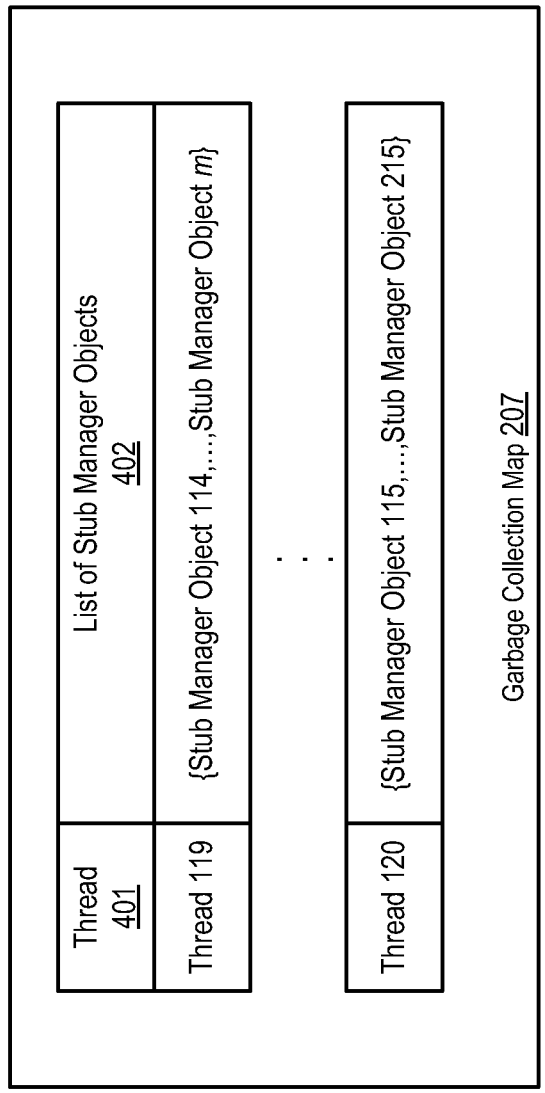
FIG. 4 is a block diagram illustrating a garbage collection map according to one embodiment.

FIG. 4 is a block diagram illustrating a garbage collection map according to one embodiment. Garbage collection map 207 includes thread column 401 for storing one or more thread identifiers (IDs) or process IDs identifying one or more threads, each of which is associated with a list of one or more stub manager objects stored in list of stub manager objects column 402, for example, in a form of stub manager object IDs, handles, or pointers corresponding to stub manager objects. In the illustrated example, garbage collection map 207 includes thread 119 associated with a list of {stub manager object 114, . . . , stub manager object m} and thread 120 associated with a list of {stub manager object 115, . . . , stub manager object 215}.

Returning now back to FIG. 2. As part of operation 4, access manager 120 adds the new stub manager object to garbage collection map 207. In this example, stub manager object 114 is instantiated for client application 110, which is associated with thread 119. Accordingly, access manager 120 adds stub manager object 114 to the list of stub manager objects associated with thread 119 in garbage collection map 207. As part of operation 4, access manager 120 further returns to client application 110 a reference to the new stub manager object.

According to one embodiment, each stub manager object includes a service stub object, wherein the service stub includes logic for connecting to and communicating with a service skeleton. A stub manager object, in one embodiment, is a wrapper object around the service stub included therein, thus providing a layer of isolation between the connection logic of the service stub and the rest of web service system 105. In one embodiment, each stub manager object includes logic for causing its service stub to connect, disconnect, and verify the current state of the connection (e.g., live or dead). A stub manager object further includes logic for maintaining/collecting statistics concerning the connection (e.g., time of last usage of the connection, etc.). Other logic may be included as part of a stub manager object without departing from the broader scope and spirit of the present invention. In one embodiment, each stub manager object is immutable (i.e., a stub manager object is instantiated to connect to a specific service endpoint, and such a connection cannot be changed after the stub manager has been created).

At operation 5, client application 110 uses the established connection between stub manager object 114 and service endpoint 160 to invoke services provided by service endpoint 160. For example, client application 110 may use the connection to call on server application 162 to perform some services. It should be noted that since each stub manager object is instantiated to connect to a specific service endpoint, client application 110 may use stub manager object 114 to verify a live connection to service endpoint 160, and reconnect or disconnect the connection if necessary, without having to re-perform operations 1 and 2.

In one embodiment, a managed entity object is instantiated for each connection. Each managed entity is adapted to receive and store objects returned by the remote service endpoint associated with its connection. For example, in response to receiving data objects from service endpoint 160, client application 110 passes the received data objects and key 205 to a managed entity class constructor, which in turn, instantiates managed entity 112 using key 205. As described above, each managed entity contains a reference to the key that describes the service endpoint from which it receives the data objects. For example, managed entity 112 contains a reference to key 105.

At operation 6, managed entity 112 receives information returned by service endpoint 160, wherein the information is associated with the services invoked by client application 110 via the connection between stub manager object 114 and service endpoint 160. By way of example, suppose that client application 110 requested server application 162 executing at service endpoint 160 to retrieve backup data, and that the backup data has been returned and stored in managed entity 112. Suppose that client application 110 now needs to determine the last backup date (i.e., the date on which the backup data was last backed up). Client application 110 may simply call on managed entity 112 for this information. Managed entity 112 uses its referenced key (i.e., key 205) to request access manager 120 to provide a reference to a stub manager for communicating with service endpoint 160. Access manager 120 uses the key (provided by managed entity 112) and thread 119 (i.e., the thread to which client application 110 is associated with) to identify and return stub manager 114 to managed entity 112. Managed entity 112 then uses stub manager 114 to communicate with server application 162 (via service skeleton 161) and request for the backup date. Server application 162 returns the information to managed entity 112, which in turn sends it to client application 110.

It should be noted that because each managed entity maintains a reference to a key that identifies the service endpoint of its connection (as opposed to maintaining a reference to a stub manager), the managed entities can be passed across multiple threads, and their usage would be thread safe. For example, client application 111 associated with thread 120 may also request managed entity 112 for the same backup date, causing managed entity 112 to request access manager 120 to provide a reference to a corresponding stub manager. Access manager 120, however, would return stub manager 115 (as opposed to stub manager 114) because the request is associated with thread 120 (i.e., the thread to which client application 111 is associated with). Thus, even though a managed entity is passed across multiple threads, using mechanisms provided by access manager 120, embodiments of the present invention avoid data corruption because each thread is provided with its own stub manager to a service endpoint.

At operation 7, in response to determining a predetermined duration of time has expired, access manager 120 performs garbage collection on the instantiated stub manager objects (e.g., by calling on method cleanOrphanedAndExpiredConnections( )). It should be understood that operation 7 is performed periodically and may be performed in parallel with operations 1 through 6.

According to one embodiment, access manager 120 performs garbage collection by, for each list of stub manager objects in garbage collection map 207, determining whether the thread associated with the list is dead. For example, access manage 120 may call on an object of each thread included in thread column 401 of FIG. 4 to determine whether the thread is dead or live. In response to determining a thread is dead, access manager 120 causes all stub manager objects in the list to disconnect from their corresponding service endpoints, and removes the thread and its associated list of stub manager objects from garbage collection map 207 Alternatively, if access manager 120 determines that the thread is live, access manager 120 determines whether the thread associated with the list has used the stub manager objects included in the list within a predetermined timeout duration. For example, access manager 120 may call on a method in each stub manager object to determine when the stub manager object was last used by a client application. In response to determining the thread associated with the list has not used a stub manager object in the list within a predetermined timeout duration, access manager 120 causes the stub manager object to disconnect from the corresponding service endpoint.

It should be noted that client application 111 may perform operations similar to those performed by client application 110 to establish a connection between service stub manager object 115 and service endpoint 160. It should be noted that a conventional service client would instantiate a single service stub for both threads 119 and 120 when the client applications connect to the same service endpoint. This results in a non-thread safe usage of the service stub. Web service system 105 of the present invention overcomes such limitations by instantiating a stub manager object for each thread. For example, when access manager 120 performs operation 3 for client application 111, access manager 120 identifies the stub manager map that is specific to thread 120, which includes a list of stub manager objects that are specifically instantiated for thread 120.

It should be further noted that by using keys to generate stub manager objects, embodiments of the present invention enable a thread to connect to multiple service endpoints simultaneously. In the illustrated example, thread 120 includes a connection between stub manager object 115 and endpoint 160, and a connection between stub manager object 215 and service endpoint 260. Thus, the mechanisms provided by key factory 121 and access manager 120 enable multiple threads to access the same service endpoint in a thread safe manner, and further enable each thread to perform multiple web service calls simultaneously.

Figure 5:
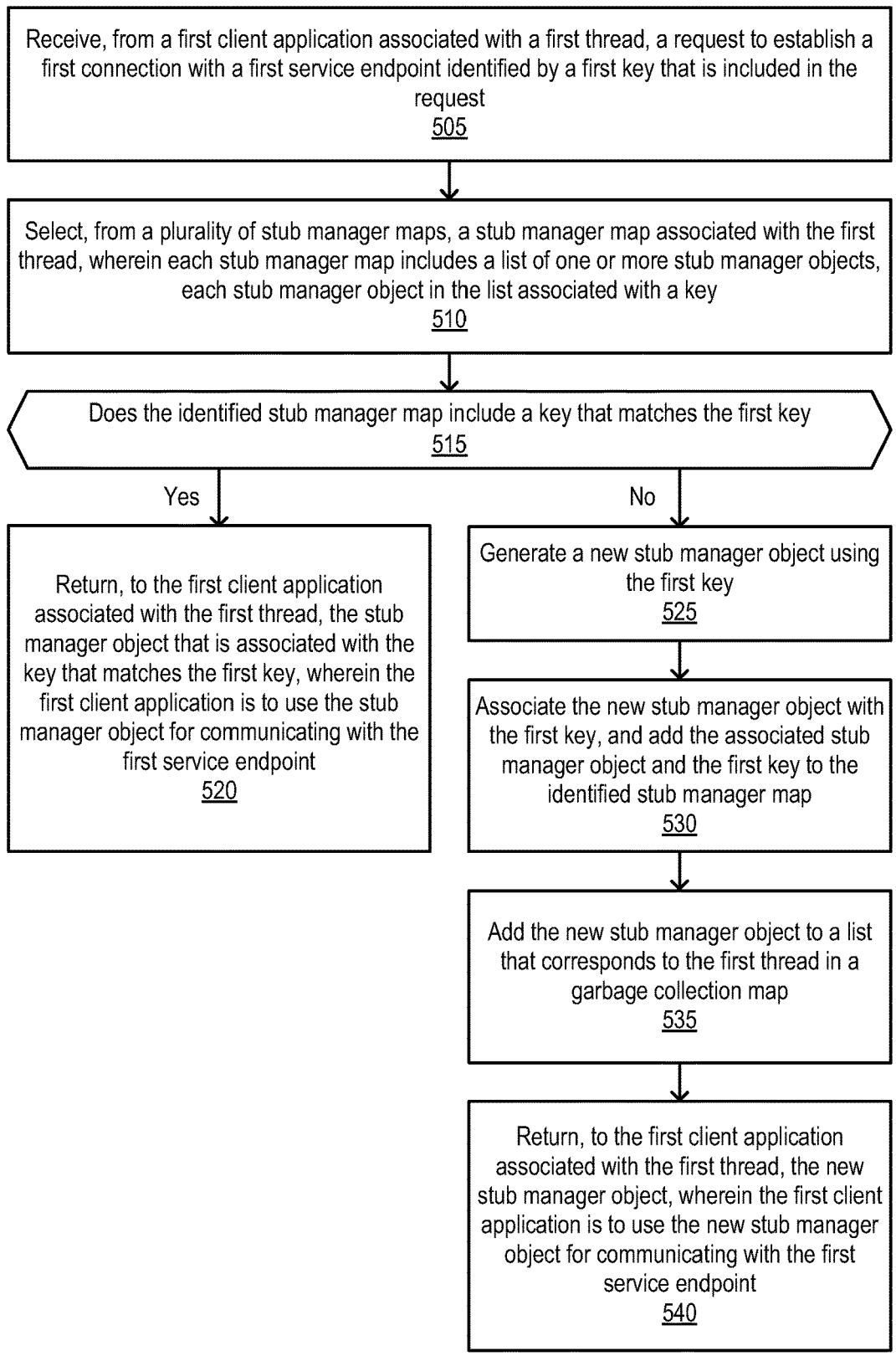
FIG. 5 is a flow diagram illustrating a method for performing web service calls according to one embodiment.

FIG. 5 is a flow diagram illustrating a method for performing web service calls according to one embodiment. For example, method 500 can be performed by access manager 120. Method 500 can be implemented in software, firmware, hardware, or any combination thereof. Method 500 shall now be described with reference to FIG. 2.

Referring now to FIG. 5, at block 505, an access manager receives from a first client application associated with a first thread, a request to establish a first connection with a first service endpoint identified by a first key that is included in the request. For example, as part of operation 2, access manager 120 receives from client application 110 associated with thread 119, a request to establish a first connection with service endpoint 160 identified by key 205 that is included in the request.

At block 510, the access manager selects, from a plurality of stub manager maps, a stub manager map associated with the first thread, wherein each stub manager map includes a list of one or more stub manager objects, each stub manager object in the list associated with a key. For example, as part of operation 3, access manager 120 selects, from stub manager maps 202-203, stub manager map 202 associated with thread 119.

At block 515, the access manager determines whether the identified stub manager map includes a key that matches the first key. For example, as part of operation 4, access manager 120 determines whether stub manager map 202 includes a key that matches key 205 included in the request.

At block 520 (the "Yes" branch of block 515), the access manager returns, to the first client application associated with the first thread, the stub manager object that is associated with the key that matches the first key, wherein the first client application is to use the stub manager object for communicating with the first service endpoint. For example, as part of operation 4, access manager 120 returns, to client application 110 associated with thread 119, stub manager object 114 that is associated with the key that matches key 205 included in the request, wherein client application 110 is to use stub manager object 114 for communicating with service endpoint 160.

At block 525 (the "No" branch of block 515), the access manager generates a new stub manger object using the first key. For example, as part of operation 4, access manager 120 causes stub manager 204 to generate a new stub manager object using key 205 included in the request.

At block 530, the access manager associates the new stub manager object with the first key, and adds the associated stub manager object and the first key to the identified stub manager map. For example, as part of operation 4, access manager 120 associates the new stub manager object with key 205, and adds the associated stub manager object and key 205 to stub manager map 202.

At block 535, the access manager adds the new stub manager object to a list that corresponds to the first thread in a garbage collection map. For example, as part of operation 4, access manager 120 adds the new stub manager object to a list that corresponds to thread 119 in garbage collection map 207.

At block 540, the access manager returns, to the first client application associated with the first thread, the new stub manager object, wherein the first client application is to use the new stub manager object for communicating with the first service endpoint. For example, as part of operation 4, access manager 120 returns, to client application 110 associated with thread 119, the new stub manager object, wherein client application 110 is to use the new stub manager object for communicating with service endpoint 160.

Figure 6:
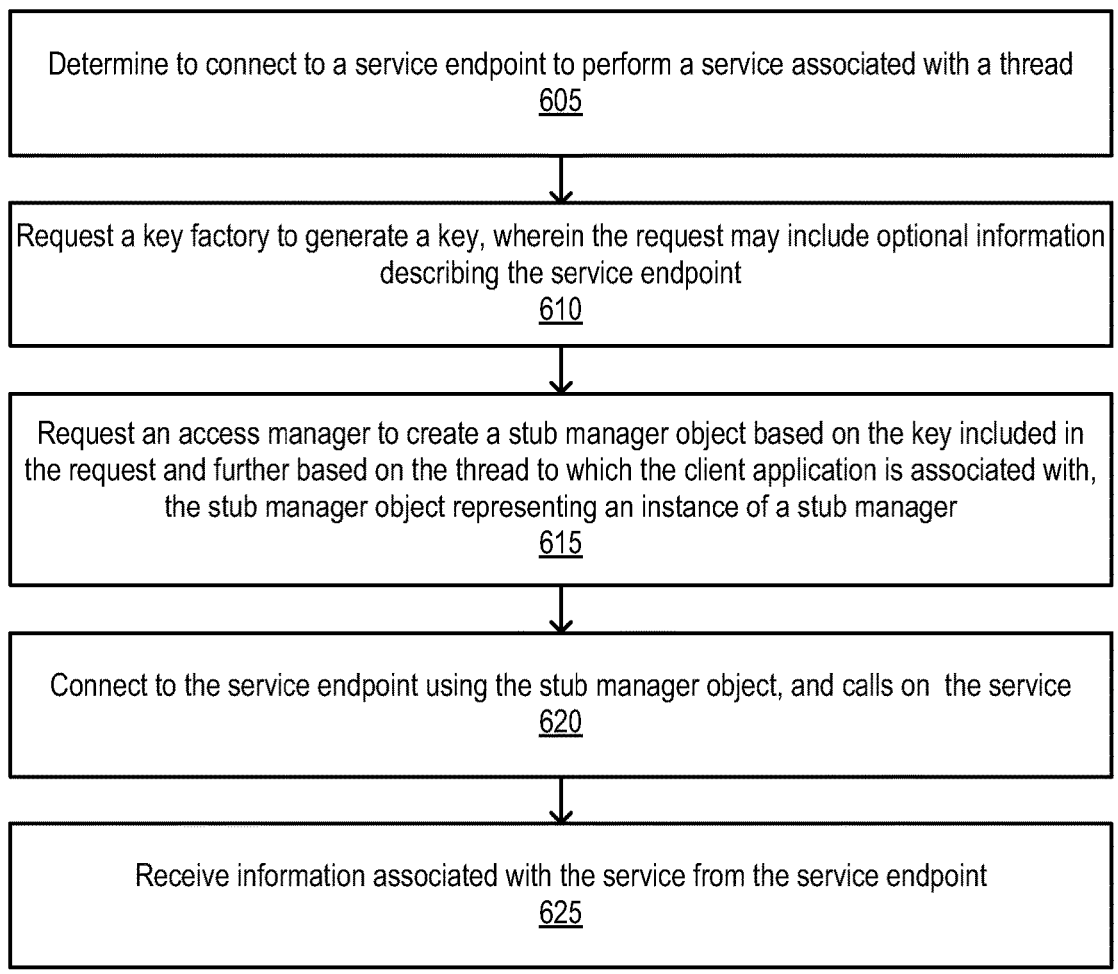
FIG. 6 is a flow diagram illustrating a method for performing web service calls according to one embodiment.

FIG. 6 is a flow diagram illustrating a method for performing web service calls according to one embodiment. For example, method 600 can be performed by client applications 110-111. Method 600 can be implemented in software, firmware, hardware, or any combination thereof. Method 600 shall now be described with reference to FIG. 2.

Referring now to FIG. 6, at block 605, a client application determines to connect to a service endpoint to perform a service associated with a thread. For example, client application 110 determines to connect to service endpoint 160 to perform a service associated with thread 119.

At block 610, the client application requests a key factory to generate a key, wherein the request may include optional information describing the service endpoint. For example, as part of operation 1, client application 110 requests key factory 121 to generate a key, wherein the request may include optional information (e.g., connection details) describing service endpoint 160.

At block 615, the client application requests an access manager to create a stub manager object based on the key included in the request and further based on the thread to which the client application is associated with, the stub manager object representing an instance of a stub manager. For example, as part of operation 2, client application 110 requests access manager 120 to create a stub manager object based on key 205 included in the request and further based on thread 119 to which client application 110 is associated with, the stub manager object representing an instance of stub manager 204.

At block 620, the client application connects to the service endpoint using the stub manager object, and calls on the service. For example, as part of operation 5, client application 110 connects to service endpoint 160 using stub manager object 114, and sends a service request to service endpoint 160. At block 625, the client application receives information associated with the service from the service endpoint. For example, as part of operation 6, client application 110 receives information (stored by managed entity 112) from service endpoint 160.

Figure 7:
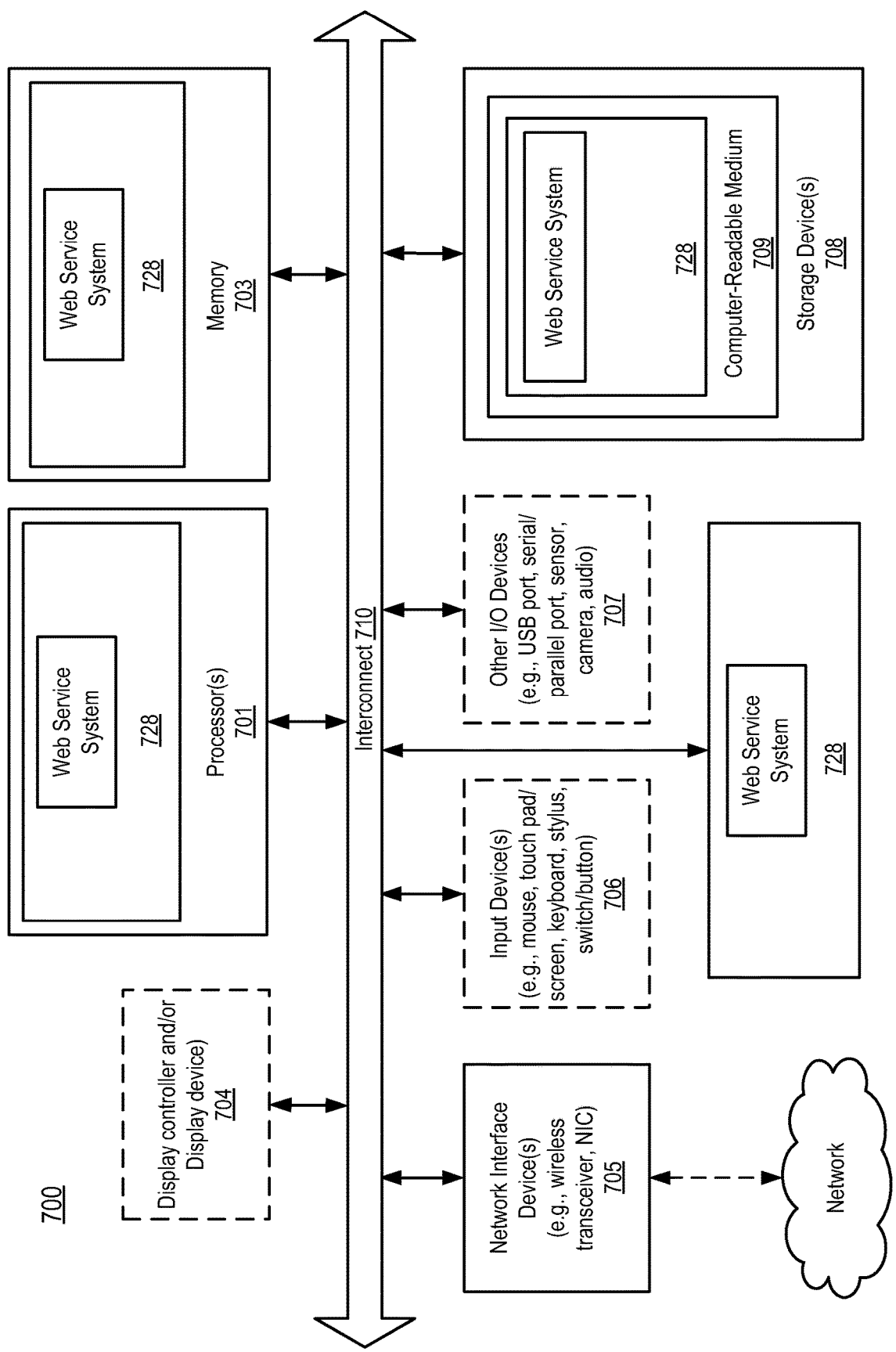
FIG. 7 is a block diagram illustrating a data processing system according to one embodiment.

FIG. 7 is a block diagram illustrating an example of a data processing system which may be used with one embodiment of the invention. For example, system 700 may represent any of data processing systems described above performing any of the processes or methods described above. System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 700 is intended to show a high level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-708 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701, which may be a low power multi-core processor socket such as an ultra-low voltage processor, may act as a main processing unit and central hub for communication with the various components of the system. Such processor can be implemented as a system on chip (SoC). Processor 701 is configured to execute instructions for performing the operations and steps discussed herein. System 700 may further include a graphics interface that communicates with optional graphics subsystem 704, which may include a display controller, a graphics processor, and/or a display device.

Processor 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor 701, or any other device. For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 700 may further include IO devices such as devices 705-708, including network interface device(s) 705, optional input device(s) 706, and other optional 10 device(s) 707. Network interface device 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with display device 704), a pointer device such as a stylus, and/or a keyboard (e.g., physical keyboard or a virtual keyboard displayed as part of a touch sensitive screen). For example, input device 706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including a basic input/output software (BIOS) as well as other firmware of the system.

Storage device 708 may include computer-accessible storage medium 709 (also known as a machine-readable storage medium or a computer-readable medium) on which is stored one or more sets of instructions or software (e.g., module, unit, and/or logic 728) embodying any one or more of the methodologies or functions described herein. Module/unit/logic 728 may also reside, completely or at least partially, within memory 703 and/or within processor 701 during execution thereof by data processing system 700, memory 703 and processor 701 also constituting machine-accessible storage media. Module/unit/logic 728 may further be transmitted or received over a network via network interface device 705.

Computer-readable storage medium 709 may also be used to store the some software functionalities described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 728, components and other features described herein can be implemented as discrete hardware components or integrated in the functionality of hardware components such as ASICS, FPGAs, DSPs or similar devices. In addition, module/unit/logic 728 can be implemented as firmware or functional circuitry within hardware devices. Further, module/unit/logic 728 can be implemented in any combination hardware devices and software components.

Note that while system 700 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method comprising:
   receiving, from a first client application associated with a first thread, a first request to establish a first connection with a first service endpoint providing a first service, the first request including a first connection key that describes the first service endpoint;
   in response to the first request, identifying a first stub manager object that corresponds to the first connection key and the first thread, the first stub manager object representing a first instance of a stub manager;

providing, exclusively to the first client application of the first thread, the first stub manager object, wherein the first client application of the first thread is to use the first stub manager object for communicating with the first service endpoint; and maintaining a plurality of stub manager maps, wherein each of the plurality of stub manager maps corresponds to a single thread, wherein each of the plurality of stub manager maps includes a list of one or more stub manager objects, wherein a plurality of stub manager objects are storable in each of the plurality of stub manager maps, and wherein each of the one or more stub manager objects in the list is associated with a connection key, each connection key describing a service endpoint.

2. The method of claim 1, further comprising:

receiving, from a second client application associated with a second thread, a second request to establish a second connection with the first service endpoint, the second request including the first connection key;

in response to the second request, identifying a second stub manager object that corresponds to the first connection key and the second thread, the second stub manager object representing a second instance of the stub manager; and providing, exclusively to the second client application of the second thread, the second stub manager object, wherein the second client application of the second thread is to use the second stub manager object for communicating with the first service endpoint.

3. The method of claim 1, wherein identifying the first stub manager object comprises:

identifying a first stub manager map from the plurality of stub manager maps that corresponds to the first thread;

identifying a connection key in the first stub manager map that matches the first connection key; and determining the first stub manager object to be a stub manager object that is associated with the connection key that matches the first connection key.

4. The method of claim 1, wherein identifying the first stub manager object comprises:

identifying a first stub manager map from the plurality of stub manager maps that corresponds to the first thread;

determining that the first connection key does not match any connection key in the first stub manager map; and generating a new stub manager object using the first connection key.

5. The method of claim 4, further comprising:

adding the new stub manager object and the first connection key to the first stub manager map.

6. The method of claim 4, further comprising:

maintaining a garbage collection map comprising of a plurality of lists of stub manager objects, wherein each list of the plurality of lists of stub manager objects is associated with a thread; and adding the new stub manager object to a list in the garbage collection map that is associated with the first thread, wherein the plurality of lists of stub manager objects in the garbage collection map are used for performing garbage collection.

7. The method of claim 6, further comprising:

after a predetermined periodic duration of time, performing garbage collection by, for each list of stub manager objects in the garbage collection map:

in response to determining a thread associated with the list is dead:

disconnecting all stub manager objects in the list from their corresponding service endpoints, and removing the list of stub manager objects and its associated thread from the garbage collection map; and in response to determining the thread associated with the list is live and further in response to determining the thread associated with the list has not used a stub manager object in the list for a predetermined timeout duration:

disconnecting the stub manager object from a corresponding service endpoint.

8. The method of claim 1, further comprising:

receiving, from the first client application associated with the first thread, a request to generate the first connection key; and generating the first connection key based on information included in the request, wherein the information identifies the first service endpoint.

9. A non-transitory computer-readable storage medium having computer code stored therein, which when executed by a processor, causes the processor to perform operations comprising:

receiving, from a first client application associated with a first thread, a first request to establish a first connection with a first service endpoint providing a first service, the first request including a first connection key that describes the first service endpoint;

in response to the first request, identifying a first stub manager object that corresponds to the first connection key and the first thread, the first stub manager object representing a first instance of a stub manager;

providing, exclusively to the first client application of the first thread, the first stub manager object, wherein the first client application of the first thread is to use the first stub manager object for communicating with the first service endpoint; and maintaining a plurality of stub manager maps, wherein each of the plurality of stub manager maps corresponds to a single thread, wherein each of the plurality of stub manager maps includes a list of one or more stub manager objects, wherein a plurality of stub manager objects are storable in each of the plurality of stub manager maps, and wherein each of the one or more stub manager objects in the list is associated with a connection key, each connection key describing a service endpoint.

10. The non-transitory computer-readable storage medium of claim 9, further comprising:

receiving, from a second client application associated with a second thread, a second request to establish a second connection with the first service endpoint, the second request including the first connection key;

in response to the second request, identifying a second stub manager object that corresponds to the first connection key and the second thread, the second stub manager object representing a second instance of the stub manager; and providing, exclusively to the second client application of the second thread, the second stub manager object, wherein the second client application of the second thread is to use the second stub manager object for communicating with the first service endpoint.

11. The non-transitory computer-readable storage medium of claim 9, wherein identifying the first stub manager object comprises:
  identifying a first stub manager map from the plurality of stub manager maps that corresponds to the first thread;
  identifying a connection key in the first stub manager map that matches the first connection key; and
  determining the first stub manager object to be a stub manager object that is associated with the connection key that matches the first connection key.

12. The non-transitory computer-readable storage medium of claim 9, wherein identifying the first stub manager object comprises:
  identifying a first stub manager map from the plurality of stub manager maps that corresponds to the first thread;
  determining that the first connection key does not match any connection key in the first stub manager map; and
  generating a new stub manager object using the first connection key.

13. The non-transitory computer-readable storage medium of claim 12, further comprising:
  adding the new stub manager object and the first connection key to the first stub manager map.

14. The non-transitory computer-readable storage medium of claim 12, further comprising:
  maintaining a garbage collection map comprising of a plurality of lists of stub manager objects, wherein each list of the plurality of lists of stub manager objects is associated with a thread; and
  adding the new stub manager object to a list in the garbage collection map that is associated with the first thread, wherein the plurality of lists of stub manager objects in the garbage collection map are used for performing garbage collection.

15. The non-transitory computer-readable storage medium of claim 14, further comprising:
  after a predetermined periodic duration of time, performing garbage collection by, for each list of stub manager objects in the garbage collection map:
    in response to determining a thread associated with the list is dead:
      disconnecting all stub manager objects in the list from their corresponding service endpoints, and
      removing the list of stub manager objects and its associated thread from the garbage collection map; and
    in response to determining the thread associated with the list is live and further in response to determining the thread associated with the list has not used a stub manager object in the list for a predetermined timeout duration:
      disconnecting the stub manager object from a corresponding service endpoint.

16. The non-transitory computer-readable storage medium of claim 9, further comprising:
  receiving, from the first client application associated with the first thread, a request to generate the first connection key; and
  generating the first connection key based on information included in the request, wherein the information identifies the first service endpoint.

17. A data processing system, comprising:
  a set of one or more processors; and
  a non-transitory machine-readable storage medium containing code, which when executed by the set of one or more processors, causes the data processing system to
  receive, from a first client application associated with a first thread, a first request to establish a first connection with a first service endpoint providing a first service, the first request including a first connection key that describes the first service endpoint,
  in response to the first request, identify a first stub manager object that corresponds to the first connection key and the first thread, the first stub manager object representing a first instance of a stub manager,
  provide, exclusively to the first client application of the first thread, the first stub manager object, wherein the first client application of the first thread is to use the first stub manager object for communicating with the first service endpoint, and
  maintain a plurality of stub manager maps, wherein each of the plurality of stub manager maps corresponds to a single thread, wherein each of the plurality of stub manager maps includes a list of one or more stub manager objects, wherein a plurality of stub manager objects are storable in each of the quality of stub manager maps, and wherein each of the one or more stub manager objects in the list is associated with a connection key, each connection key describing a service endpoint.

18. The data processing system of claim 17, wherein the non-transitory machine-readable storage medium further contains code, which when executed by the set of one or more processors, causes the data processing system to:
  receive, from a second client application associated with a second thread, a second request to establish a second connection with the first service endpoint, the second request including the first connection key;
  in response to the second request, identify a second stub manager object that corresponds to the first connection key and the second thread, the second stub manager object representing a second instance of the stub manager; and
  provide, exclusively to the second client application of the second thread, the second stub manager object, wherein the second client application of the second thread is to use the second stub manager object for communicating with the first service endpoint.

19. The data processing system of claim 17, wherein identifying the first stub manager object comprises the data processing system to:
  identify a first stub manager map from the plurality of stub manager maps that corresponds to the first thread;
  identify a connection key in the first stub manager map that matches the first connection key; and
  determine the first stub manager object to be a stub manager object that is associated with the connection key that matches the first connection key.

20. The data processing system of claim 17, wherein identifying the first stub manager object comprises the data processing system to:
  identify a first stub manager map from the plurality of stub manager maps that corresponds to the first thread;
  determine that the first connection key does not match any connection key in the first stub manager map; and
  generate a new stub manager object using the first connection key.

21. The data processing system of claim 20, wherein the non-transitory machine-readable storage medium further contains code, which when executed by the set of one or more processors, causes the data processing system to:
  add the new stub manager object and the first connection key to the first stub manager map.

22. The data processing system of claim 20, wherein the non-transitory machine-readable storage medium further contains code, which when executed by the set of one or more processors, causes the data processing system to:
- maintain a garbage collection map comprising of a plurality of lists of stub manager objects, wherein each list of the plurality of lists of stub manager objects is associated with a thread; and
- add the new stub manager object to a list in the garbage collection map that is associated with the first thread, wherein the plurality of lists of stub manager objects in the garbage collection map are used for performing garbage collection.

23. The data processing system of claim 22, wherein the non-transitory machine-readable storage medium further contains code, which when executed by the set of one or more processors, causes the data processing system to:
- after a predetermined periodic duration of time, perform garbage collection by, for each list of stub manager objects in the garbage collection map:
  - in response to determining a thread associated with the list is dead:
    - disconnect all stub manager objects in the list from their corresponding service endpoints, and
    - remove the list of stub manager objects and its associated thread from the garbage collection map; and
  - in response to determining the thread associated with the list is live and further in response to determining the thread associated with the list has not used a stub manager object in the list for a predetermined timeout duration:
    - disconnect the stub manager object from a corresponding service endpoint.

24. The data processing system of claim 17, wherein the non-transitory machine-readable storage medium further contains code, which when executed by the set of one or more processors, causes the data processing system to:
- receive, from the first client application associated with the first thread, a request to generate the first connection key; and
- generate the first connection key based on information included in the request, wherein the information identifies the first service endpoint.

* * * * *